United States Patent [19]

Stevicks

[11] Patent Number: 5,794,976
[45] Date of Patent: Aug. 18, 1998

[54] SAFETY SHIELD FOR ALL TERRAIN VEHICLES

[76] Inventor: Roy A. Stevicks, P.O. Box 413, Gregory, S. Dak. 57533

[21] Appl. No.: 581,241

[22] Filed: Dec. 29, 1995

[51] Int. Cl.$^6$ .............................. B60R 19/00; B60R 3/00
[52] U.S. Cl. .................... 280/770; 280/847; 280/848; 293/115; 293/126
[58] Field of Search ................ 280/847, 848, 280/849, 850, 851, 854, 770, 756; 296/77.1, 78.1; 293/105, 112, 115, 117, 126, 127, 128, 141, 142, 146

[56] References Cited

U.S. PATENT DOCUMENTS

| | | | |
|---|---|---|---|
| D. 159,439 | 7/1950 | Phillips | 293/115 |
| D. 299,324 | 1/1989 | Oba. | |
| 1,290,958 | 1/1919 | Foster | 280/847 |
| 1,427,763 | 8/1922 | Stoll | 280/163 |
| 1,457,259 | 5/1923 | Malluk et al. | 280/847 |
| 1,486,660 | 3/1924 | Hajdu | 293/163 |
| 1,517,323 | 12/1924 | Trahan | 280/163 |
| 1,713,405 | 5/1929 | Stansfeld | 280/847 |
| 1,749,453 | 3/1930 | Thomas | 280/847 |
| 1,863,475 | 6/1932 | Fox | 280/848 |
| 2,906,359 | 9/1959 | Wagner. | |
| 3,704,031 | 11/1972 | Confer | 293/142 |
| 4,102,432 | 7/1978 | Bustin | 280/163 |
| 4,168,855 | 9/1979 | Koch. | |
| 4,176,771 | 12/1979 | Dubroc, Sr.. | |
| 4,247,030 | 1/1981 | Amacker. | |
| 4,655,307 | 4/1987 | Lamoureux. | |
| 4,657,294 | 4/1987 | Rumpp. | |
| 4,728,121 | 3/1988 | Graves. | |
| 4,798,399 | 1/1989 | Cameron. | |
| 4,813,706 | 3/1989 | Kincheloe. | |
| 4,852,900 | 8/1989 | Nahachewski. | |
| 4,950,017 | 8/1990 | Norton. | |
| 4,973,082 | 11/1990 | Kincheloe. | |
| 5,036,939 | 8/1991 | Johnson. | |
| 5,062,675 | 11/1991 | Rhoden. | |
| 5,174,622 | 12/1992 | Gutta. | |
| 5,203,601 | 4/1993 | Guillot. | |
| 5,277,465 | 1/1994 | Weir. | |
| 5,477,209 | 12/1995 | Benson, Jr. et al. | 340/479 |
| 5,509,717 | 4/1996 | Martin | 280/756 |
| 5,531,478 | 7/1996 | Houston et al. | 280/756 |

FOREIGN PATENT DOCUMENTS 378344  7/1922  Germany .................. 280/847

*Primary Examiner*—Brian L. Johnson
*Assistant Examiner*—Min Yu
*Attorney, Agent, or Firm*—John G. Premo

[57] ABSTRACT

A protective assembly for all terrain vehicles comprising a front end protector dimensioned to protect substantially all of the front end. It also comprises side rails having front and back ends which are parallel to and spaced away from the sides of the all terrain vehicle which tubular side rails are shaped to receive and have mounted thereon auxiliary front and rear fenders. There is also present a debris deflecting running board. Optional features are rear wheel mud guards and a high intensity light mounted on the steering assembly and a flood light on the rear of the vehicle.

8 Claims, 2 Drawing Sheets

U.S. Patent    Aug. 18, 1998    Sheet 1 of 2    5,794,976
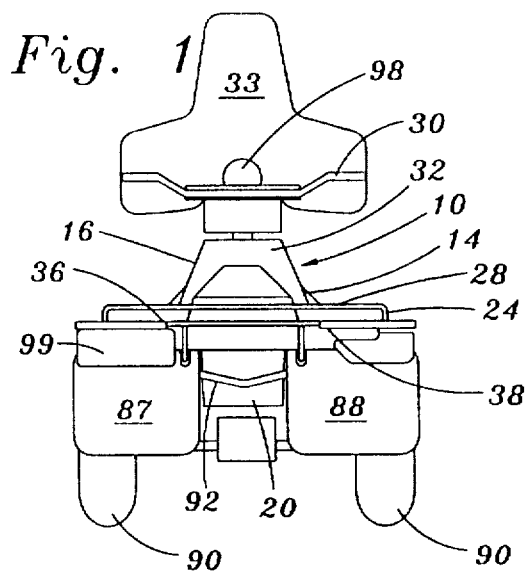
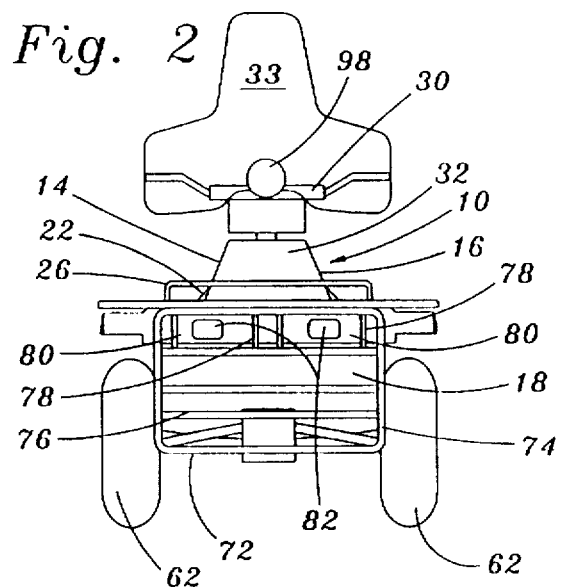
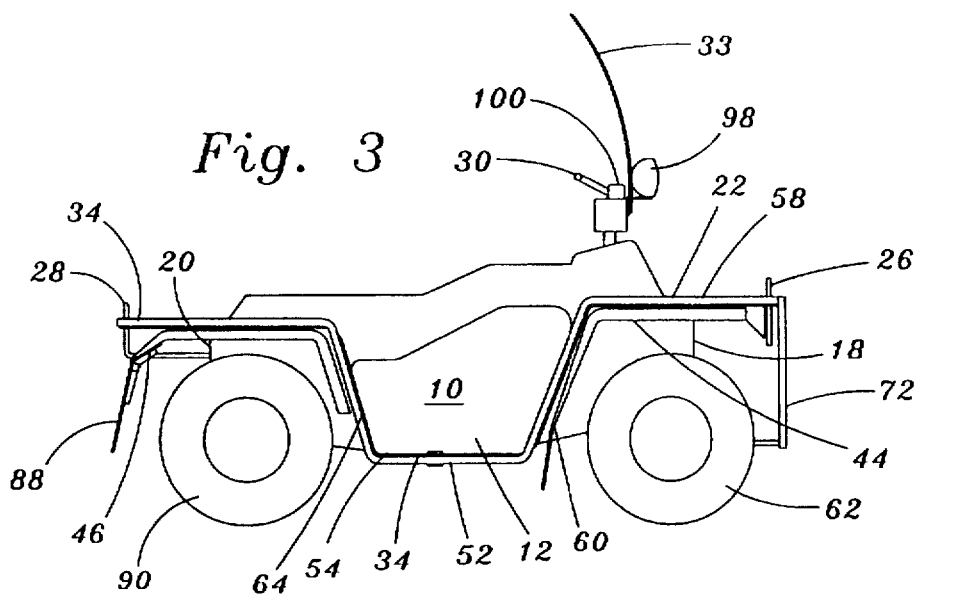
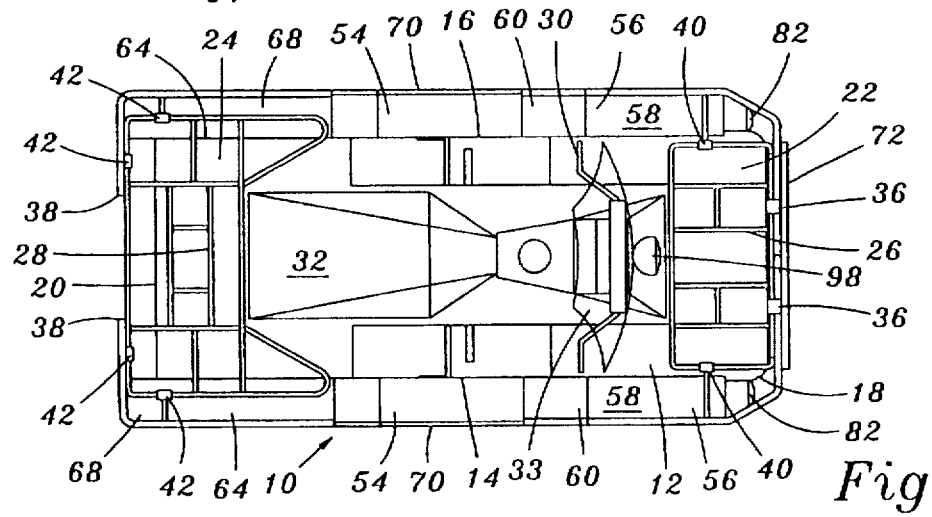

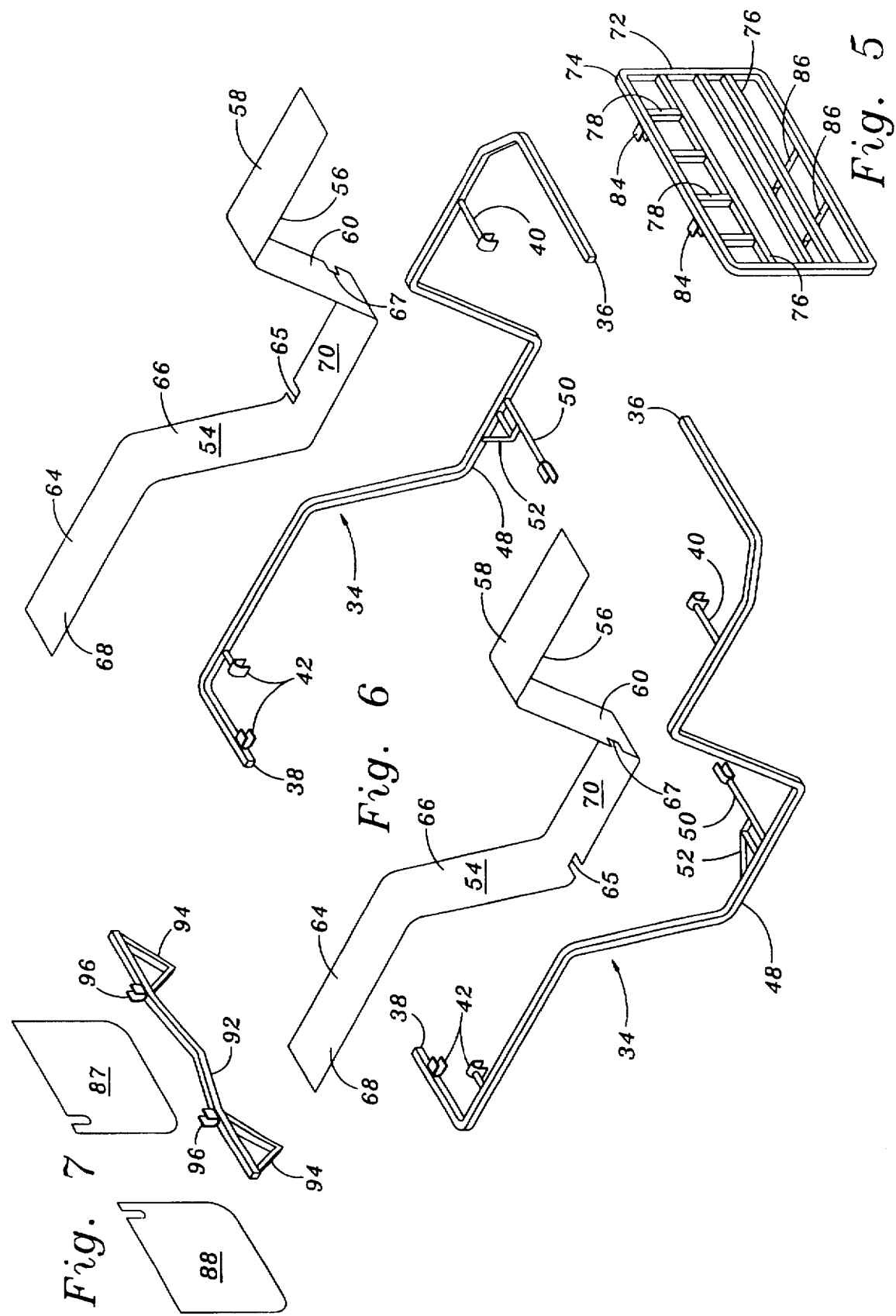

SAFETY SHIELD FOR ALL TERRAIN VEHICLES

FIELD OF THE INVENTION

The invention relates to a system for protecting all terrain vehicles.

BACKGROUND OF THE INVENTION

All terrain vehicles, ATVs, are used primarily on rugged terrain. Four wheel ATVs, which term includes ATV's having more than four wheels, often incur damage to front drives and front ends including head lights. Four wheel ATVs often sustain damage to the original equipment fenders. Also, side skids may cause damage to foot rest areas and controls as well as causing tires to become flat.

An annoying features of four wheel ATVs is that turf, dirt and debris is thrown by centrifugal force of the wheels. This causes splashing which strikes the operator and coats the vehicle.

While these vehicles are equipped with conventional headlights the fact that they are used in terrains which are rugged these lights often fail to provide adequate illumination. A better lighting system is needed to increase driver safety.

It would be of benefit to the art if these problems could be solved, eliminated or reduced thereby decreasing the likelihood of vehicle damage and also improving driver safety.

SUMMARY OF THE INVENTION

The invention comprises a protective assembly for all terrain vehicles. These vehicles are four wheeled vehicles having a frame, chassis, sides, a front end having headlights, a back end, a hood containing a horizontally disposed carrier, a rear deck containing a horizontally disposed carrier, steering means and a saddle. The protective assembly of the invention comprises a front end protector dimensioned to protect substantially all of the front end of the all terrain vehicle. There are provided side rails having front and back ends which are parallel to and spaced away from the sides of the all terrain vehicle to deflect from the vehicle and operator solid obstacles. This spacing is, in most instances, at least the distance of the width of the fenders measured from the chasis of the vehicle. The side rails are shaped to receive and have mounted thereon auxiliary front and rear fenders. The side rails also are shaped to receive and have mounted thereon a debris deflecting running board. The auxiliary front and rear fenders and the debris deflecting running board being continuously connected. The front end protector and the side rails are readily fabricated from tubular metal or plastic.

In further embodiments, the auxiliary front and rear fenders and the debris deflecting running board are fabricated from a semi-flexible, resilient, durable, light weight material. This material is preferably a continuous strip of semi-rigid belting.

The back end of the vehicle is fitted with a rear end protector which has attached thereto flexible rear wheel mud guards. Optionally, the steering means is fitted with a high intensity light. The rear of the ATV may be fitted with a flood light. Both lights may be used for signaling.

The front of the ATV is fitted with a front end protector which is rectangular in configuration, contains parallel grill members, and headlight shaped openings adjoining the headlights of the all terrain vehicle, which openings afford better forward vision. The front end protector preferably extends above the top of the front end of the all terrain vehicle. The front end protector is mounted in the front grill area. The lower end of this protector begins substantially at the level of the axle and continues upwards to a level substantially to that of the front fenders. The protection extends laterally substantially to the inner wall of the front wheel rims.

The front and back of the side rails are mounted to the front and back end carriers. The side rails are mounted to the center of the frame by means of a horizontal strut which is perpendicular to a side rail and is reinforced to the side rail by means of a angular brace which preferably is in the shape of a trapezoid.

BRIEF DESCRIPTION OF THE DRAWINGS

With respect to the drawings:

FIG. 1 is a rear view of an ATV fitted with mud flaps and a rear end protector.

FIG. 2 is a front view of an ATV fitted with a front end protector.

FIG. 3 is a side view of an ATV fitted with protective side rails on which are mud guards and running boards.

FIG. 4 is a top view of FIG. 3.

FIG. 5 is a perspective view of the front end protector.

FIG. 6 is an exploded view showing the side rail assembly as being a pair for mounting on each side of the ATV as well as views of the fenders, mud guards and running boards.

FIG. 7 is a perspective view of the mud flaps and a mounting frame therefor.

With respect to the drawings like parts have like numbers.

DETAILED DESCRIPTION OF THE PREFERRED EMBODIMENT

There is shown in FIGS. 1, 2 and 3 a four wheel ATV designated generally by the numeral 10. The vehicle has a tubular frame, not shown, and a chassis 12. The sides of the ATV are numbered 14 and 16 respectively. The ATV also has a front end 18 and a back 20. The front of the vehicle has a hood 22 and a rear deck 24. Mounted on the hood and rear deck are horizontally positioned tubular grilled carriers numbered 26 and 28 respectively. The ATV is steered by means of handle bars 30. The ATV is fitted with a conventional saddle 32, which is most clearly illustrated in FIG. 4, and a wind shield 33.

The primary portion of the protective system of the invention comprises a side rail 34. There are a mirror imaged pair of these rails which is shown to best advantage in FIG. 6. The side rails are continuous and have their ends 36 and 38 attached to the front and rear deck carriers by means of mounting brackets 40 and 42. The front and rear of the side rail are contoured so as to fit over existing front fender 44 and rear fender 46 of the ATV 10. The center portion of side rail 34 is shaped to provided a running board support area generally designated by the numeral 48. The center of the running board support contains a horizontal, perpendicularly positioned support bracket 50 which is reinforced with angular trapezoidal shaped brace 52. The support brackets 40, 42 and 50 are of sufficient length to position the side rail 34 away from the sides 14 and 16 of the ATV 10. This distance is preferably at least the width of front and rear fenders 44 and 46 as measured from the side of the chassis 12.

Mounted to each of the side rails by means of suitable fasteners such as screws or rivets and extending inwardly toward the chassis 12 of the ATV 10 is a strip of semi-flexible, resilient, durable and lightweight material designated by the numeral 54. This strip may be cut from heavy duty belting stock, plastic, rubber or tire stock. The front portion of the strip 56 is in the shape of an inverted L and acts as an auxiliary fender. The top 58 of the inverted L at least partially shields the front and backs of the original fenders 44 and 46 and provides at least partial protection for the original fenders of the ATV. The bottom 60 of the inverted L provides protection from mud and debris thrown up from the front wheels 62. Similarly, the back portion 64 of strip 54 is also in the shape of an inverted L and functions as an auxiliary fender. Its front 66 acts as a mud and debris guard. Its rear portion 68 offers at least partial shielding to the original rear fender.

The center of the strip 70, is fastened to the upper side of side rail 34, and is attached to support bracket 50 and brace 52, which in turn are connected to a frame member. The remainder of strip 54 by means of slots 65 and 67 is fitted to the underside of side rails 34. This arrangement provides a convenient sturdy running board, mud and debris defectors as well as fender guards. It also functions to prevent road hazards from being thrown against the rider's legs and to protect the vehicle from damage due to impact against the side of the ATV.

To provide further protection to the ATV there is additionally provided by the invention front end protector 72 which is shown in detail in FIG. 5. The front end protector is sized to cover the front end 18 of the ATV 10. It is constructed of tubing and has a rectangular frame 74 and within this frame are horizontally disposed bars 76. As shown in FIG. 2 the top portion of the frame may contain short vertical bars 78 which define openings 80 which outline headlights 82. The top of the front end protector contains mounting brackets 84 for mounting onto the front carrier 26. The bottom of the front end protector contains two perpendicular, horizontally positioned struts 86 which allow fastening the bottom of the front end protector 72 to the frame of the ATV. In a preferred embodiment of the invention the top of the front end protector 72 extends above the front end 18 of the ATV 10.

The back 20 of the ATV is fitted with mud guards 86 and 88 which prevent mud and debris from being thrown by rear wheels 90. As shown in FIG. 7 the mud guards are attached to mud guard mounting frame 92. This frame has a slight V at its center. It also functions as a rear end protector. Each end contains vertically fitted to its bottom a pair of triangular shaped mounting frames 94. The top portion of mud guard mounting frame is fitted with two clips 96 which allow the assembly to be mounted to the frame of the ATV.

The handle bars 30 have mounted at their center point a high intensity light 98. As shown in FIG. 3 the light is so mounted that it moves with the movement of the handle bars. Further, as shown in FIG. 3 the light is fitted with a signaling switch 100 which allows the operator of the ATV to turn off and flash the light for courtesy, safety and help in cases of emergency. The light 98 is preferably a high intensity light of the type used as landing lights for commercial aircraft.

Shown in FIG. 1 and designated by the numeral 99, is a rear flood light. This light allows the vehicle to be backed up safely in heavy darkness and where the terrain is treacherous. This light can function as a flood light, a conventional back-up light and as a signalling light. This light features facile manual on/off and signaling switchability with either hand of the operator even when wearing heavy gloves. These features facilitates signaling and illumination to the rear.

ADVANTAGES OF THE INVENTION

A special advantage of the present invention is that it lowers the center of gravity of the all terrain vehicle. By lowering the center of gravity the inherent stability of the vehicle while turning, as well as maneuvering and parking on hills and banks is enhanced. Thus, both the safety of the operator is increased and the security of the vehicle is improved.

As compared with ATVs without the safety shield of the present invention, this invention lowers the center of gravity at least 0.5%. Typically, the reductions are within the range of 1.3% to about 4% as compared to ground level on level ground. Percentage lowering of the center of gravity is defined as follows:

$$P=(C_b-C_a)/C_b \times 100\% \text{ where,}$$

P is the percent lowering of the center of gravity.

$C_b$ is the center of gravity before the installation of the safety shield on to the ATV, as measured from ground level to the center of gravity while the vehicle is perfectly horizontal.

$C_a$ is the center of gravity after installation of the safety shield on to the ATV, as measured from ground level to the center of gravity while the vehicle is perfectly horizontal.

P varies from model to model of ATV and as to the amount of weight added to the bottom of the frame of the safety shield. If the weight is added to the bottom of the frame, it is added to the lowest lying part 48, which is substantially midway from the front to the back of the ATV. The added weight would be distributed equally to both sides. This makes for the best lateral and front to rear balance and stability and maneuverability of the ATV. The addition of weight is not shown in the drawings.

The principle point here is that even a 1.3% to 2% lowering of the center of gravity resulted in a surprising 8% to 10% increase in overall stability and ease of handling of the vehicle. This was particularly noticeable in cornering and on work motion uphill and downhill. Work motion uphill resulted in an increase in stability and maneuverability up to 20%. Downhill work motion resulted in an increase in stability and maneuverability up to 15%.

Another special advantage is the utilization of a front and rear lights for emergency use; as a signaling device and general trail and terrain safety. They are useful for signaling other vehicles and persons for safety purposes and when trouble arises.

A further special advantage is that it protects the front, sides rear and fenders of the ATV from damage while simultaneously protecting the operator from injury. For example, the protective assembly minimizes vehicle damage and operator whipping and backlash action of springy plants when driving over rough terrain. Thus, both the safety of the operator is increased and the security of the vehicle is improved.

I claim:

1. A protective assembly for attached to a four wheel all terrain vehicle having a frame, chassis, sides, a front end having headlights, a back end, a hood and a rear deck, both of which contain horizontally disposed carriers, steering means and a saddle: which protective assembly provides a lowering of the center of gravity of at least of 0.5% to the all terrain vehicle and, comprises a front end protector dimensioned to protect substantially all of the front end: side rails having front and back ends which are adapted to be mounted parallel to and spaced away from the sides of the all terrain vehicle which side rails have areas shaped to receive and have mounted thereon auxiliary front and rear fenders and a debris deflecting running board where the auxiliary front and rear fenders and the debris deflecting running board are fabricated from a semi-flexible resilient material and with the auxiliary front and rear fenders and the debris deflecting running board being continuously connected.

2. The protective assembly of claim 1 where the semi-flexible resilient material is a continuous strip of semi-rigid belting mounted to the top of the side rails in the running board area and to the underside of the side rails in the front and rear fender areas.

3. The protective assembly for all terrain vehicles of claim 1 where the back end is fitted with a combination back end protector and a mudguard-mounting frame having a top and bottom, a V shape at its center and fitted to its bottom a pair of triangular shaped mounting frames and which has attached thereto flexible rear wheel mudguards.

4. The protective assembly of claim 1 where the front end protector is a rectangular frame which contains parallel grid members, and headlight shaped openings which outline the headlights of the all terrain vehicle.

5. The protective assembly of claim 4, in which the front end protector extends vertically above the top of the front end of the all terrain vehicle.

6. The protective assembly of claim 1, where the front and back of the side rails are mounted to the hood and rear deck carriers of the all terrain vehicle and to the frame at a point corresponding to the center of the running board.

7. The protective assembly of claim 6 in which the side rails are mounted to the frame at a point corresponding to the center of the running board by means of a horizontal strut which is perpendicular to the side rail and is reinforced to the frame by means of an angular brace substantially at each end of the support member and substantially coplanar with the angular brace.

8. The protective assembly of claim 7 where the angular brace with a portion of the side rail and strut is in the shape of a trapezoid.

* * * * *